United States Patent [19]

Hermann et al.

[11] Patent Number: 4,870,783
[45] Date of Patent: Oct. 3, 1989

[54] ELASTOMERIC PROFILED SEALING MEMBER

[75] Inventors: Dietmar Hermann, Garbsen; Michael Bethge, Hanover, both of Fed. Rep. of Germany

[73] Assignee: Continental Aktiengesellschaft, Hanover, Fed. Rep. of Germany

[21] Appl. No.: 249,598

[22] Filed: Sep. 26, 1988

[30] Foreign Application Priority Data

Oct. 17, 1987 [DE] Fed. Rep. of Germany ....... 3735248

[51] Int. Cl.⁴ ................................................ E06B 7/22
[52] U.S. Cl. .................................................... 49/477
[58] Field of Search ...................... 49/477; 277/34, 226

[56] References Cited

U.S. PATENT DOCUMENTS

| | | | |
|---|---|---|---|
| 2,469,131 | 5/1949 | Ross | 49/477 |
| 2,700,196 | 1/1955 | Panhard | 49/477 X |
| 2,908,948 | 10/1959 | Jones | 49/477 X |
| 3,449,864 | 6/1969 | Prost-Dame et al. | 277/34 X |
| 3,745,707 | 7/1973 | Herr | 49/477 X |
| 3,984,942 | 10/1976 | Schroth | 49/477 |
| 4,073,521 | 2/1978 | Mena | 49/477 X |

FOREIGN PATENT DOCUMENTS 2067637 7/1981 United Kingdom .

*Primary Examiner*—Philip C. Kannan
*Attorney, Agent, or Firm*—Becker & Becker, Inc.

[57] ABSTRACT

A profiled sealing member made of elastomeric material. The sealing member is disposed on a vehicle body, especially for sealing off side door window panes. Via a hollow space that can be pressurized or inflated, the profiled sealing member also extends about that edge portion of the window that is directed toward the outside of the vehicle.

3 Claims, 1 Drawing Sheet

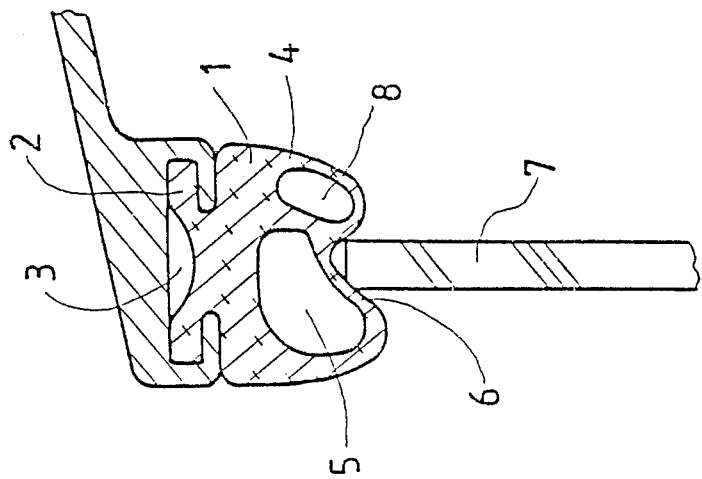
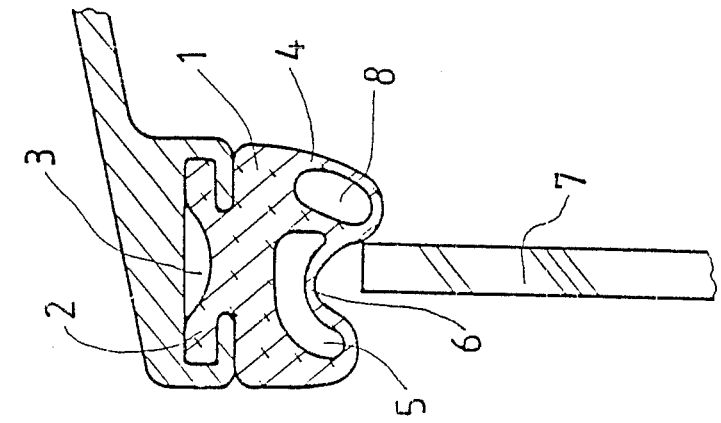

ELASTOMERIC PROFILED SEALING MEMBER

BACKGROUND OF THE INVENTION

The present invention relates to a profiled sealing member that is made of elastomeric material, such as rubber or rubber-like synthetic material, and is to be disposed on a closeable opening of a motor vehicle body to seal off a window or windows, especially side door window panes, relative to the opening of the vehicle body. The profiled sealing member has a resiliently flexible sealing portion and a hollow space that can be pressurized and evacuated.

With profiled sealing members, which are usually mounted on the body of a motor vehicle, for example on the opening for a door, the free edge portion of the side window pane rests from the outside against the resiliently flexible sealing portion of the profiled sealing member. Known embodiments of such profiled sealing members are partially hose-shaped, or are made of a soft rubber or plastic. Side window panes that are sealed off with these known profiled sealing members tend to flutter at high vehicle speeds. In addition, unwelcome rattling noises can occur, especially where the roadway is in poor condition. Furthermore, the heretofore known profiled sealing members are not always in a position to optimally compensate for the unavoidable tolerances of the dimensions of the window panes and seals that occur during mass production, so that it is not possible to ensure to the desired extent that all of the window pane edges will be protected from the penetration of water, dust, or air draft.

U.K. patent application No. 2 067 337 Kruschwitz dated July 30, 1981 proposes a profiled sealing member where the aforementioned drawbacks are partially avoided. This known profiled sealing member essentially comprises a rubber or plastic hollow member against which the side window pane of a motor vehicle door resiliently rests. When the vehicle moves, air is pressed through an opening in a feed line to the hollow member, as a result of which the air pressure in the hollow member increases. The effect of this pressure increase is that the hollow member expands and thereby rests more securely against the window. In this way, a fluttering of the side window panes can be reduced at higher vehicle speeds.

It is an object of the present invention to improve a profiled sealing member of the aforementioned general type in such a way that not only the fluttering or movement of window panes at greater speeds is prevented, but it should also be possible to achieve a satisfactory sealing effect at greater gap tolerances. Furthermore, unwelcome rattling noises should also be capable of being avoided, even at low speeds.

BRIEF DESCRIPTION OF THE DRAWING

These and other objects and advantages of the present invention will appear more clearly from the following specification in conjunction with the accompanying schematic drawing, in which:

FIG. 1 is a cross-sectional view through one exemplary embodiment of, the inventive profiled sealing member in a non-effective position; and FIG. 2 is a cross-sectional view of the profiled sealing member of FIG. 1, but in an effective, sealing position where it fixes the window pane that is resting thereagainst.

SUMMARY OF THE INVENTION

The profiled sealing member of the present invention is characterized primarily in that a sealing and support element is provided that delimits the hollow space outwardly, remote from the vehicle body opening on which the sealing member is disposed; when the hollow space is under pressure, the sealing and support element is adapted to extend about that edge portion of a window that is directed toward the outside of the vehicle.

As a result, the inventive profiled sealing member fulfills not only a sealing function, but rather at the same time the window pane is securely held in position, and is pressed against the resiliently flexible sealing portion, as a result of the enveloping of the edge region by the pressurized hollow space, so that the aforementioned drawbacks of the heretofore known profiled sealing members, such as a fluttering of the window panes at higher speeds, as well as rattling noises, no longer occur. To accomplish this, it is not necessary to retain or seal all of the free edge portions of the window pane or side panes with an inventively embodied profiled sealing member; rather, disposing the inventive profiled sealing member on, for example, only that side of the frame or body that is adjacent the roof of the vehicle would be conceivable. A further advantage is that the inventive profiled sealing member is quite able to compensate for the aforementioned unavoidable manufacturing tolerances. If the retaining function of the profiled sealing member is discontinued by lowering or relieving the pressure, the forces required for moving the window pane, especially a sliding window, are advantageously slight.

Pursuant to one preferred specific embodiment of the present invention, when the retaining function is discontinued, the sealing and support element is drawn into the interior of the hollow space, whereby the hollow space is at normal pressure or a slight partial vacuum. If therefore the inventive profiled sealing member is used to seal and retain the side window panes of vehicle doors, a problem-free opening and closing of the vehicle door is ensured, even if the compressed air system fails.

For the resiliently flexible support of that edge portion of the window pane that faces the interior of the vehicle, it is advantageous if a further hollow space is provided in the sealing portion of the profiled sealing member, whereby this further hollow space can also be connected to the compressed air system.

The profiled sealing member of the present invention is provided in particular for sealing and retaining side window panes of vehicle doors that do not have a complete frame for guiding and holding the side window panes. Accordingly, the profiled sealing member is secured to the door frame of the vehicle body at least on one side of the frame, especially on that side of the frame that is associated with the roof of the vehicle. Of course, other sides of the door frame could also be provided with an inventive profiled sealing member, at least partially, and primarily where the movable side window pane is to be sealed off. It is readily possible to have any desired combination of the inventive profiled sealing member and other known sealing member constructions.

Further specific features of the present invention will be described in detail subsequently.

DESCRIPTION OF PREFERRED EMBODIMENTS

Referring now to the drawing in detail, the profiled sealing member 1, which is made of rubber or plastic, is secured to the vehicle in the door opening by suitable means. In the illustrated embodiment, the profiled sealing member 1 has a base portion 2 that is retained in a receiving slot 3 of a part that is securely connected to the vehicle.

In addition to the base portion 2, the profiled sealing member 1 is provided with a sealing portion 4 for the resilient and flexible support of that edge region of the window pane that faces the interior of the vehicle. A hollow space 8 is provided in the sealing portion 4. Furthermore, the profiled sealing member 1 has a further hollow space 5 that extends over the entire length of the profiled sealing member 1. This hollow space 5 is delimited toward the outside by a flexible sealing and support element 6 of uniform thickness.

The arrangement of the profiled sealing member 1 on the vehicle is such that when the door is closed, the sealing and support element 6 faces the end face or end faces of the side window pane 7. In the non-effective position shown in FIG. 1, the sealing and support element 6 is drawn into the hollow space 5, with either a slight partial vacuum of, for example, 0.5 bar, or preferably normal atmospheric pressure existing in the hollow space 5. As a result, as shown in FIG. 1, the vehicle door can be opened and closed without difficulty even when the side window pane 7 is closed, i.e. is rolled all the way up.

If when the vehicle door is closed, the side window pane 7 is disposed in its uppermost, i.e. closed, position, the profiled sealing member 1 should perform its sealing and support function. For this purpose, it is necessary to inflate the hollow space 5, in other words, to place the hollow space 5 under a higher pressure. It is sufficient to generate a pressure differential of 0.5 bar relative to the originally prevailing inner pressure. In so doing, the sealing and support element 6 extends about the edge portion of the side window pane 7 on the outer side of the vehicle. On the inner side of the vehicle, the window pane 7 is pressed against the sealing portion 4 of the profiled sealing member 1.

Due to the fact that the profiled sealing member 1 extends about the edge of the window pane on the outer side of the vehicle under pressure, the window pane 7 is securely held in position, so that the window pane cannot move or shift in a direction perpendicular to its surface at high vehicle speeds. As a result, unwelcome rattling noises are also avoided. In addition, the inventive profiled sealing member 1 does a better job of compensating for unavoidable manufacturing tolerances than do the conventional constructions.

The retaining function of the profiled sealing member 1 is discontinued when the vehicle door or the side window pane is to be opened or closed. For this purpose, an appropriate cooperation with a central, pneumatically operated door-locking mechanism is preferred for the generation of a partial vacuum or pressure in the hollow space 5 of the profiled sealing member 1. To open and close the side window panes, a simultaneous generation of pressure or partial vacuum together with an electrical window raising or lowering mechanism can be provided. At any rate, a number of technically feasible operating mechanisms are available.

It should be understood that it is also possible to secure the inventive profiled sealing member 1 to the vehicle using a base portion that is embodied differently than the base portion 1 shown in the illustrated embodiment.

The present invention is, of course, in no way restricted to the specific disclosure of the specification and drawing, but also encompasses any modifications within the scope of the appended claims.

What we claim is:

1. In a profiled sealing member that is made of elastomeric material and is disposed along a closeable opening of a motor vehicle body to seal off a window or windows, especially side door window panes, relative to the opening of the vehicle body, with said profiled sealing member having a resiliently flexible sealing portion and a hollow space therein that can be pressurized and evacuated, the improvement therewith comprising:
   a sealing and support element that is connected to said sealing portion and delimits said hollow space outwardly, remote from said vehicle body opening on which said profiled sealing member is disposed; when said hollow space is under pressure, said sealing and support element with the hollow space pressurized, engages predominantly externally about that edge portion of a window enveloped in a location that faces away from the inside of said vehicle both to achieve a satisfactory sealing effect at greater manufacturing gap tolerances and also to prevent unwelcome rattling noises as well as higher speeds.

2. A profiled sealing member according to claim 1, in which said sealing and support element is drawn into said hollow space when said hollow space is evacuated.

3. A profiled sealing member according to claim 2, in which a further hollow space is provided in said sealing portion.

* * * * *